US007571642B2

(12) United States Patent
Storm

(10) Patent No.: US 7,571,642 B2
(45) Date of Patent: Aug. 11, 2009

(54) METHOD AND AN ELECTRONIC CONTROL UNIT FOR DETERMINING THE DEGREE OF COOLING DURING NON-OPERATION OF AN INTERNAL COMBUSTION ENGINE

(76) Inventor: Andreas Storm, Lägatan 1, Göteborg (SE) 426 53

( * ) Notice: Subject to any disclaimer, the term of this patent is extended or adjusted under 35 U.S.C. 154(b) by 92 days.

(21) Appl. No.: 11/670,557

(22) Filed: Feb. 2, 2007

(65) Prior Publication Data

US 2007/0180896 A1 Aug. 9, 2007

(30) Foreign Application Priority Data

Feb. 3, 2006 (EP) ................................ 06101270

(51) Int. Cl.
*G01M 15/04* (2006.01)

(52) U.S. Cl. ................................ 73/114.38; 73/114.68

(58) Field of Classification Search ............. 73/114.38, 73/114.41, 114.42, 114.68
See application file for complete search history.

(56) References Cited

U.S. PATENT DOCUMENTS

| | | | | |
|---|---|---|---|---|
| 5,566,546 | A | 10/1996 | Rumpsa et al. | |
| 6,564,622 | B2 | 5/2003 | Majkowski et al. | |
| 6,568,379 | B2 | 5/2003 | Larsen | |
| 6,684,153 | B2 * | 1/2004 | Wada | 701/114 |
| 6,918,370 | B2 * | 7/2005 | Yamaoka et al. | 123/198 D |
| 7,272,485 | B2 * | 9/2007 | Amano et al. | 701/104 |
| 2002/0177941 | A1 * | 11/2002 | Wada | 701/114 |
| 2005/0224055 | A1 * | 10/2005 | Wiese et al. | 123/494 |
| 2007/0289366 | A1 * | 12/2007 | Amano et al. | 73/64.46 |

* cited by examiner

*Primary Examiner*—Eric S McCall
(74) *Attorney, Agent, or Firm*—Julia Voutyras; Allan J. Lippa

(57) ABSTRACT

The invention relates to a method for determining the degree of cooling during non-operation of an internal combustion engine. Fuel temperature characteristics at and following an engine start are determined, and the degree of cooling during non-operation of the engine is determined based at least partly on the fuel temperature characteristics. Preferably, the determination of fuel temperature characteristics comprises determining the fuel temperature at the engine at a first point in time and determining the fuel temperature at the engine at a second point in time, the second point in time following the first point in time and following a start of the engine.

10 Claims, 3 Drawing Sheets

METHOD AND AN ELECTRONIC CONTROL UNIT FOR DETERMINING THE DEGREE OF COOLING DURING NON-OPERATION OF AN INTERNAL COMBUSTION ENGINE

FIELD OF THE INVENTION

The present invention is related to a method for determining the degree of cooling during non-operation of an internal combustion engine.

BACKGROUND OF THE INVENTION

Determining the degree of cooling during non-operation of an engine can include determining whether the engine is completely cooled. Determining the degree of cooling during non-operation of an engine can also involve determining duration of continuous non-operation of the engine. Modern vehicles are equipped with units with computation and data storage capabilities, by means of which diagnosis of the vehicle is performed automatically. Such diagnoses are performed to monitor systems in the vehicle, and a main purpose is to reduce emissions. For certain systems and components, for example temperature gauges and the fuel tank system, such diagnosis requires information about the degree of cooling during non-operation of an engine and/or the soak time, i.e. the duration of continuous non-operation of the engine. Again, diagnosis of certain systems and components require that the engine is completely soaked, i.e. completely cooled down.

Known solutions include a timer (a clock) in an electronic control unit, which could be an engine control unit or a central control unit, for measuring the actual soak time of the engine. The soak time is then used for a diagnosis of a type described above. However, not all vehicles are designed with such a soak timer in its engine control system, and more importantly, incorporating a soak timer into an engine control system is costly. Further, a clock does not necessarily provide accurate information about the degree of cooling of the engine. Since the timing information of the clock has to be combined with pre-made assumptions regarding typical cooling characteristics of the engine, there is an element of uncertainty in this solution, since the assumptions may not fully correspond to the characteristics of the engine in use.

In addition to diagnose strategies, modern vehicles with an internal combustion engine engage, by use of electronic engine control systems, strategies for controlling various features of the engine's operation including the air/fuel ratio and/or various engine exhaust system temperatures. It is often necessary for the temperature at locations important in controlling the engine's operation, to be identified at the time the engine is started. By knowing the initial temperature at such locations, the air/fuel ratio, the exhaust system and other features of the engine's operation can be more accurately controlled at the initial stages after the engine is turned on. By determining the soak time, it is possible to in turn determine the temperature at locations important in controlling the engine's operation.

U.S. Pat. No. 5,566,546 discloses a method, in which a soak time is obtained by measuring the temperature of the engine and of the charging air supplied to the engine at the time the engine is turned off and when the engine is restarted. The measured temperature of the engine and of the charging air at the time the engine is turned off is stored in an electronic engine control system. Despite this method being advantageous in view of previous solutions, there is still a need for a simpler way to establish the degree of cooling during non-operation, and the duration of continuous non-operation of the engine, especially, since the solution in U.S. Pat. No. 5,566,546 requires storing measured information during the engine shut-off condition.

SUMMARY OF THE INVENTION

This invention is directed to providing an inexpensive, simple and dependable way to determine the degree of cooling during non-operation of an internal combustion engine.

Accordingly, a method for determining a degree of cooling during non-operation of an internal combustion engine includes: determining fuel temperature characteristics at and following engine start, and determining the degree of cooling during non-operation of the engine based at least partly on said fuel temperature characteristics.

The use of fuel temperature characteristics at and following an engine start results in that no clock or pre-made assumptions of engine cooling characteristics have to be used in order to determine that the engine is completely cooled down. Thus, it can be established with a very high degree of certainty whether the engine is completely soaked, i.e. completely cooled down.

Since a fuel temperature sensor is provided in most modern vehicles, the invention can be implemented without additional hardware. Therefore, a strategy to determine the degree of cooling during non-operation and/or the duration of continuous non-operation of an engine can be inexpensively incorporated into an engine control system. Also, the invention relies only on information obtained at engine restart, and therefore it is unnecessary to store measured information during the non-operational condition of the engine, in order to determine degree of cooling during non-operation and/or the duration of continuous non-operation.

Preferably, the determination of fuel temperature characteristics comprises determining the fuel temperature at the engine at a first point in time and determining the fuel temperature at the engine at a second point in time, the second point in time following the first point in time and following a start of the engine. Thereby, it can be determined that the engine is completely cooled down if the fuel temperature at the engine at a first point in time is essentially equal to the fuel temperature at the engine at a second point in time.

Since the temperature measured at the second point in time is measured in fuel that has been pumped from a location remote from the engine, and has therefore not been affected by the engine temperature during engine shut down, it can be established with a very high degree of certainty that if the temperatures measured at the first and second points in time are equal, then the engine is completely soaked, i.e. completely cooled down.

In one embodiment, a determination of the duration of continuous non-operation of the engine is performed based at least partly on predetermined information correlating fuel temperatures at the first and second points in time to values of the duration of continuous non-operation of the engine. Thereby, if the engine is not completely soaked, an accurate result of soak time can be obtained with only two measurements at and following an engine start.

DESCRIPTION OF THE DRAWINGS

Below, the invention will be described in greater detail with reference to the figures, in which.

DETAILED DESCRIPTION OF EXEMPLARY EMBODIMENT(S)

Figure 1:
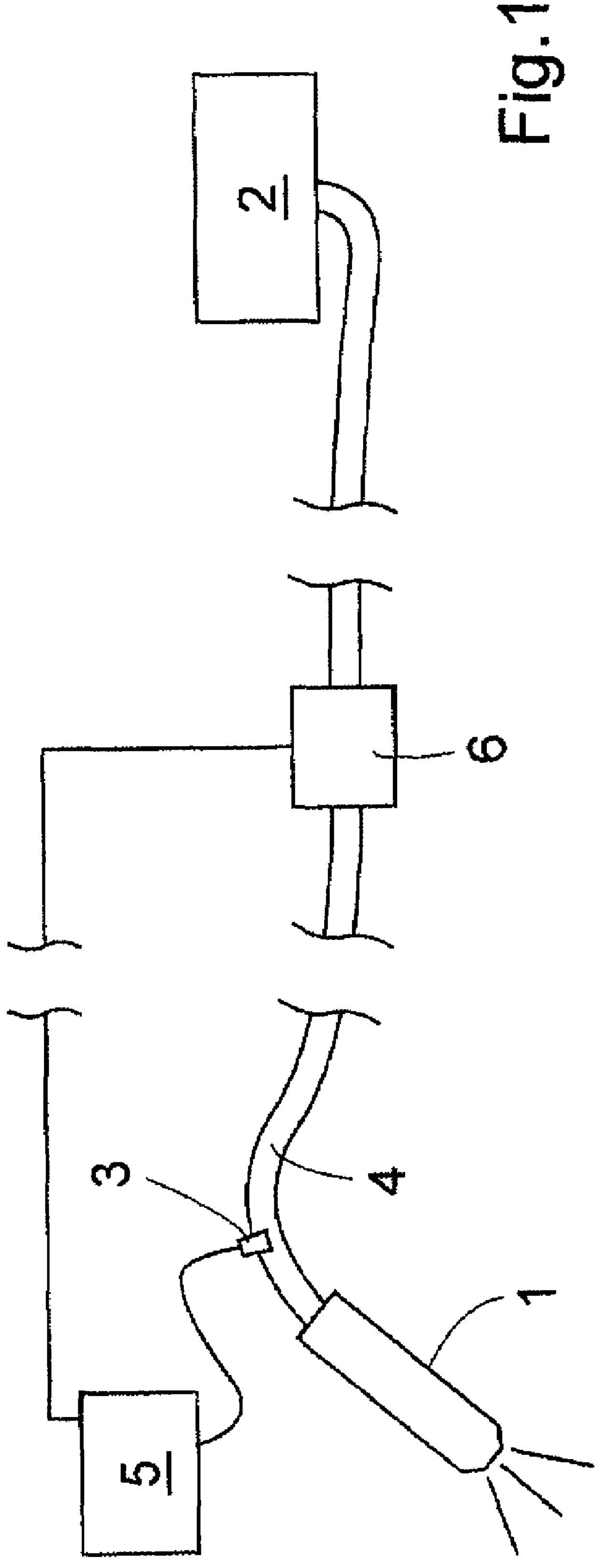
FIG. 1 shows schematically parts of an internal combustion engine.

FIG. 1 shows schematically parts of a fuel system in a vehicle with an internal combustion engine. The fuel system comprises a fuel injector 1 in the engine and a fuel tank 2. A fuel temperature sensor 3 is provided at a fuel conduit 4 connected to the fuel injector 1. In a multi-cylinder engine, usually one fuel injector 1 is provided at each cylinder, and the fuel conduits 4 at the fuel injectors 3 are branches to a main conduit from the fuel tank 2. However, a fuel temperature sensor 3 can be provided at only one of the fuel injectors 1. The fuel temperature sensor 3 is located close to the fuel injector 1. However, alternative locations for the fuel temperature sensor 3 are possible. Preferably, in any case, the fuel temperature sensor 3 should be located in the engine or in a vicinity of the engine. Also, more than one fuel temperature sensor 3 can be provided.

An electronic control unit 5 is arranged to receive information corresponding to the fuel temperature from the sensor 3. The control unit 5 has computational capabilities and storage capabilities, and can be formed by one or more physically separate, but logically connected devices. The electronic control unit 5 could be formed by an engine control unit (ECU), a central control unit or any other type of suitable control unit in a vehicle. Also depicted in FIG. 1 is a fuel pump 6 located upstream of the fuel injector 1. The fuel pump 6 is logically connected to the control unit 5, so that the latter can control the pump 6, or at least obtain, directly or from another control unit, information regarding the operational status of the pump 6.

The invention is based on the fact that when the engine in a vehicle is not operating, in the parts of the fuel supply system that are in the vicinity of the engine, the fuel is warmed up by the engine, while further away from the engine the fuel remains essentially at an ambient temperature, or is at least warmed up to a lesser degree than fuel closer to the engine.

Figure 2:
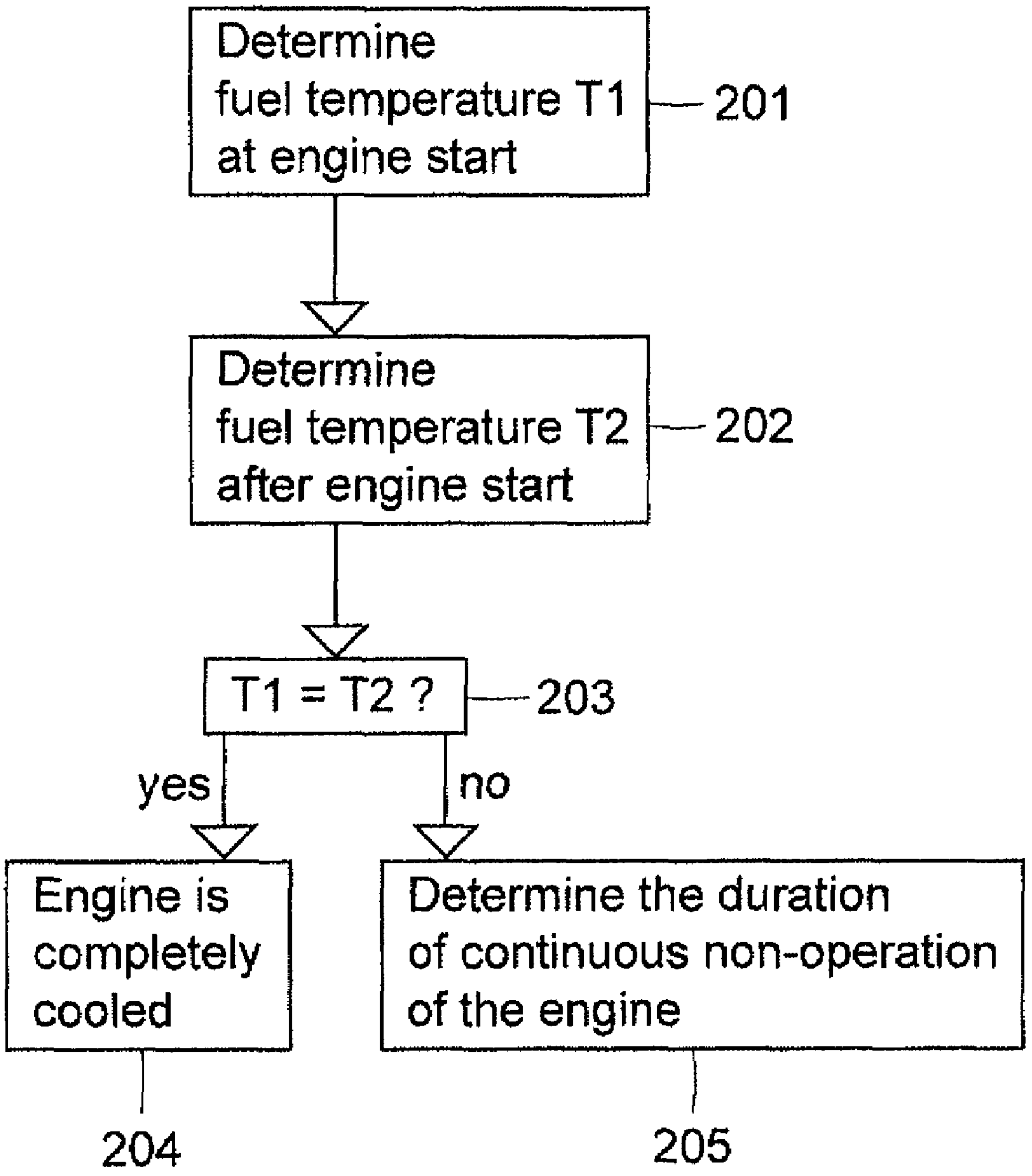
FIG. 2 is a block diagram depicting steps in a method according to one embodiment of the invention.

Reference is made to FIG. 2. One embodiment of the method according to the invention comprises the following steps: At a first point in time, the temperature T1 of the fuel at the sensor 3 is determined 201. Preferably, the first point in time is immediately before the engine is started. More specifically, the first point in time is preferably between a time of a maneuvering action by an operator/driver of the vehicle, in order to start the engine, for example turning an ignition key to a start position, and a time when the fuel pump 6 starts pumping fuel. The control unit 5 can be adapted detect such a start maneuvering action by a driver of the vehicle, and in response thereto perform the determination 201 of the fuel temperature T1 by means of the sensor 3, before sending a signal to activate the fuel pump.

Alternatively, the control unit 5 can be adapted to perform the determination 201 of the fuel temperature T1 by means of the sensor 3, before a crankshaft of the engine starts turning.

After the first detection of the fuel temperature T1, at a second point in time, the fuel temperature T2 at the engine is once again determined 202. The second point in time follows a start of the engine. Thereby, the fuel pump 6 will have pumped fuel to the fuel temperature sensor 3, which fuel, during the non-operation of the engine, has remained further away from the engine than the fuel, the temperature T1 of which was determined at the first point in time.

The measured fuel temperatures T1, T2 are compared 203. If T1=T2, then it can be determined 204 that the engine is completely cooled down. More specifically, since the temperature T2 is measured in fuel that has been pumped from a location remote from the engine, and is therefore not affected by the engine temperature, it can be established with a very high degree of certainty that if T1 is equal to T2, then the engine is completely soaked, i.e. completely cooled down.

If the measured fuel temperatures T1, T2 are not equal, then based partly on the fuel temperatures T1, T2 determined at the first and second point in time, a duration of continuous non-operation of the internal combustion engine, i.e. how long the engine has been turned off, is determined 205. This is done based also on predetermined information mapping the two determined temperatures T1, T2 to values of the duration of continuous non-operation of the engine.

Figure 3:
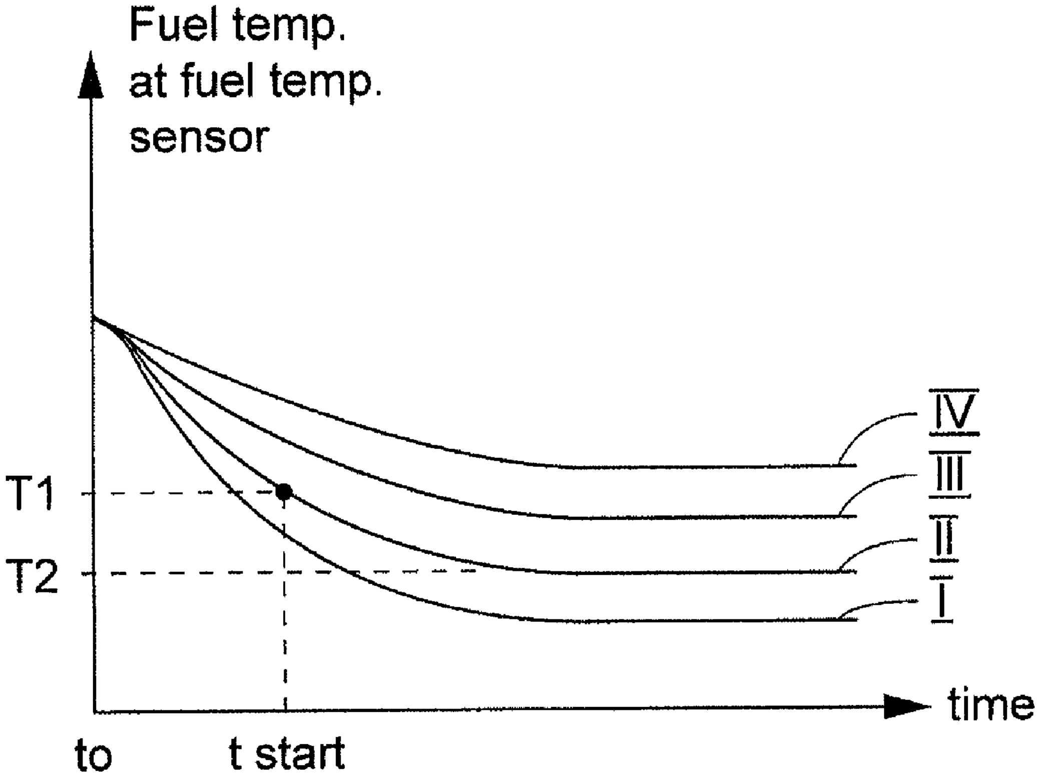
FIG. 3 is a diagram with the fuel temperature as functions of time.

Here reference is made also to FIG. 3. Said predetermined information is based on the following facts: After the engine is turned off, the temperature of the engine and also the temperature of the fuel trapped at the sensor 3 decreases gradually. For example, the fuel temperature at the sensor 3, after the engine is turned off at the time t0, could decrease as depicted in FIG. 3. At some time after the engine shut down, the temperature reaches a minimum temperature, and at that time the temperature can be assumed to be same throughout the entire fuel system. Depending on factors such as the ambient temperature, the minimum temperature can vary, and for this reason, the engine temperature can decrease differently, as depicted by the four separate curves I-IV in FIG. 3. Assuming that the temperature T2 measured 202 (FIG. 2) at the second point in time is equal to the minimum temperature, it can be established which of the curves I-IV apply in the case in question. For example, if the temperature T2 is equal or close to the minimum temperature of the curve II, the duration between the engine shut down time t0 and engine start time tStart can be established by mapping the temperature T1 to the starting time by the curve II.

FIG. 3 is given as an explanatory example. In a practical implementation, soak time values correlated to temperature values T1, T2 can be stored in a list in the control unit 5.

Alternatives to the method described with reference to FIG. 2 and FIG. 3 are possible within the scope of the claims. For example, the invention can be used only to establish whether the engine is completely cooled down, i.e., the step 205 of determining the actual soak time can be omitted.

The invention provides a very easily conducible way to establish soak time and/or establish whether the engine is completely soaked, using in most vehicles existing hardware. An accurate result can be obtained with only two measurements at engine start; thus no measurements need to be stored during engine shut down. The accuracy of the invention in establishing soak time also makes it suitable as a complement for checking and calibrating other soak time estimation strategies in an electronic control system.

The invention claimed is:

1. A method for determining a degree of cooling during non-operation of an internal combustion engine, comprising:

- determining a first fuel temperature at the engine at a first point in time when an engine ignition key is turned to a start position;
- determining a second fuel temperature at the engine at a second point in time, the second point in time following said first point in time, wherein said second point in time occurs when fuel is being pumped to the engine; and
- determining the degree of cooling of the engine based on a comparison of said first fuel temperature and said second fuel temperature.

2. The method according to claim 1, wherein a determination that the engine is completely cooled down is made if said first fuel temperature is substantially equal to said second fuel temperature.

3. The method according to claim 1, further comprising determining duration of continuous non-operation of the engine based at least on a comparison of said first and said second fuel temperatures.

4. The method according to claim 1, wherein said first point in time is before a time at which fuel is being pumped to the engine.

5. The method according to claim 1, wherein said first point in time is before a crankshaft of the engine starts turning.

6. A method for determining a degree of cooling during non-operation of an internal combustion engine, comprising:

determining a first fuel temperature at the engine at a first point in time when an engine ignition key is turned to a start position;

determining a second fuel temperature at the engine at a second point in time, said second point in time following said first point in time, wherein said second point in time occurs when a crankshaft of the engine is turning; and determining the degree of cooling of the engine based on a comparison of said first fuel temperature and said second fuel temperature.

7. The method according to claim 6, wherein a determination that the engine is completely cooled down is made if said first fuel temperature is substantially equal to said second fuel temperature.

8. The method according to claim 6, further comprising determining duration of continuous non-operation of the engine based at least on a comparison of said first and said second fuel temperatures.

9. The method according to claim 6, wherein said first point in time is before a time at which fuel is being pumped to the engine.

10. The method according to claim 6, wherein said first point in time is before a crankshaft of the engine starts turning.

* * * * *